United States Patent
Akashi et al.

[11] Patent Number: 5,671,211
[45] Date of Patent: Sep. 23, 1997

[54] DATA RECORDING MEDIUM

[75] Inventors: Ryojiro Akashi; Takashi Morikawa; Masanobu Ninomiya; Takashi Uematsu, all of Minami-ashigara, Japan

[73] Assignee: Fuji Xerox Co., Ltd., Tokyo, Japan

[21] Appl. No.: 560,302

[22] Filed: Nov. 17, 1995

[30] Foreign Application Priority Data

Nov. 24, 1994 [JP] Japan .................. 6-312369
Dec. 2, 1994 [JP] Japan .................. 6-324029

[51] Int. Cl.⁶ .......................................... G11B 7/24
[52] U.S. Cl. ......................................... 369/275.1
[58] Field of Search .................. 369/275.1–275.4, 369/110, 109

[56] References Cited

U.S. PATENT DOCUMENTS 5,339,306  8/1994  Yoshinaga et al. .............. 365/275.1

FOREIGN PATENT DOCUMENTS

| 0535930 | 4/1993 | European Pat. Off. . |
| 54-119377 | 9/1979 | Japan . |
| 57-82087 | 5/1982 | Japan . |
| 62-14114 | 1/1987 | Japan . |
| 63-191673 | 8/1988 | Japan . |
| 2-2513 | 1/1990 | Japan . |
| 3-130188 | 6/1991 | Japan . |
| 3-151294 | 6/1991 | Japan . |
| 3-180389 | 8/1991 | Japan . |
| 4-60891 | 2/1992 | Japan . |
| 4-218024 | 8/1992 | Japan . |
| 6-18866 | 1/1994 | Japan . |

OTHER PUBLICATIONS

Polymer Communications, 1983, vol. 24, Dec., "Thermotropic liquid-crystalline polymers: 14.*Thermo-recording on liquid-crystalline polymers with the aid of a laser beam", V.P. Shibav et al., pp. 364–365.

(List continued on next page.)

Primary Examiner—Nabil Hindi
Attorney, Agent, or Firm—Oliff & Berridge

[57] ABSTRACT

A data recording medium having a well-recognizable recording layer which reversibly changes in degree of light scattering when externally stimulated. One embodiment of the data recording medium of the present invention comprises (a) a visible data recording layer, the degree of light scattering of which reversibly changes when externally stimulated, (b) a transparent substrate layer, (c) a low refractive layer having a lower refractive index than the transparent substrate layer, (d) a colored substrate layer and (e) a magnetic recording layer, laminated in this order. Another embodiment of the data recording medium comprises (a) a visible data recording layer, (b) a first transparent substrate layer, (c) a low refractive layer, (d) a second transparent substrate layer and (e) a colored magnetic recording layer, laminated in this order. Still another embodiment of the data recording medium comprises (a) a visible data recording layer, (b) a light reflective layer, (c) a magnetic recording layer and (d) a substrate layer. In the data recording medium, the visible data recording layer preferably comprises a liquid crystal polymer. The recording layer may have a protective layer laminated thereon.

10 Claims, 3 Drawing Sheets

OTHER PUBLICATIONS

Japan Display, 1986, "Thermo–Optical Effect in Polymeric Liquid Crystal for Display Applications", T. Ueno et al., pp. 290–292.

Makromol Chem., Rapid Comm., "Investigations on Liquid Crystalline Polysiloxanes 3a)", Heino Finklemann et al., pp. 317–322.

Makromol Chem., 188, (1987), "Stress–induced orientation in lightly crosslinked liquid–crystalline side–group polymers", Rudolf Zental et al., pp. 665–674.

Makromol Chem., 187, (1986), "Liquid crystalline elastomers based on liquid crystalline side group, main chain and combined polymers a)", Rudolf Zental, et al., pp. 1915–1926.

Makromel Chem., 179, (1978), "Model Considerations and Examples of Enantiotropic Liquid Crystalline Polymers", Heino Finkelmann et al., pp. 273–276.

Eur. Polym. J. vol. 18 (1982), "Thermotropic Liquid–Crystalline Polymers–VI" Valery P. Shibav et al., pp. 651–659.

Mol. Cryst. Liq. Cryst. vol. 169 (1989), "Application of Side Chain Type Liquid Crystal Polymer for Display and Recording Devices", T. Nakamura et al., pp. 167–192.

DATA RECORDING MEDIUM

FIELD OF THE INVENTION

The present invention relates to a novel data recording medium having a magnetic recording layer and a recording layer which can perform rewritable recording, which can be used as a magnetic card or a magnetic recording medium having a rewritable visible data recording portion.

BACKGROUND OF THE INVENTION

In recent years, a novel recording medium comprising a visible data recording portion which can perform rewritable recording of data and a magnetic recording portion in combination has been proposed (JP-A-3-180389 (The term "JP-A" as used herein means an "unexamined published Japanese patent application"), JP-A-3-130188, etc.). Such a recording medium can be applied to a magnetic card provided with a rewritable recording means to add thereto the amount of data which can be provided to display the content of the magnetic card. Such a magnetic card is disclosed in JP-A-3-151294 and JP-A-4-60891.

The foregoing recording medium normally comprises a composite layer having an organic low molecular compound dispersed in a polymer binder as a material which performs rewritable recording of visible data. When heated, the recording medium reversibly change in degree of light scattering to perform recording and erasure. Materials which can be used for such a recording medium are disclosed in JP-A-54-119377 and JP-A-57-82087.

As recording techniques concerning the reversible change in degree of light scattering using a liquid crystal polymer there have been known JP-A-62-14114, JP-A-2-2513, Pollan. Commun., Vol. 24, 364 (1983), Japan Display, page 260 (1986), etc.

The conventional magnetic recording medium which comprises in combination a visible data recording portion and a magnetic recording portion, in which the visible data recording portion comprises a composite layer having an organic low molecular compound dispersed in a polymer binder, and is adapted to undergo reversible change in degree of light scattering to perform display/recording, is disadvantageous in that the visible data recording portion exhibits a low contrast and hence a poor recognizability and lacks durability. In particular, the visible data recording layer normally displays white letters and other images on a silver background, to thereby cause a feeling of physical disorder. Further, due to ambient light rays or image reflection, it is difficult to definitely distinguish the content of recording. The conventional rewritable recording medium comprising a liquid crystal polymer can record letters colored silver or the like on a white background but is disadvantageous in that it exhibits insufficient contrast.

From the standpoint of recognizability, it is ideally preferred that the contrast be enough high to provide definite discrimination of white and black display. However, recording media provided with such a display recording means have not been found.

SUMMARY OF THE INVENTION

The present invention has therefore been worked out in the light of the foregoing problems with the prior art.

An object of the present invention is to provide a magnetic recording medium having excellent recognizability and durability.

Other objects of the present invention will be apparent from the following description.

The above objects of the present invention is achieved by providing a data recording medium having a specific constitution which has a visible data recording layer and a magnetic recording layer.

One embodiment of the data recording medium of the present invention comprises (a) a visible data recording layer, the degree of light scattering of which reversibly changes when externally stimulated, (b) a transparent substrate layer, (c) a low refractive layer having a lower refractive index than said transparent substrate layer, (d) a colored substrate layer and (e) a magnetic recording layer, laminated in this order.

Another embodiment of the data recording medium comprises (a) a visible data recording layer, the degree of light scattering of which reversibly changes when externally stimulated, (b) a first transparent substrate layer, (c) a low refractive layer having a lower refractive index than said first transparent substrate layer, (d) a second transparent substrate layer and (e) a colored magnetic recording layer, laminated in this order.

Still another embodiment of the data recording medium comprises (a) a visible data recording layer, the degree of light scattering of which reversibly changes when externally stimulated, (b) a light reflective layer, (c) a magnetic recording layer and (d) a substrate layer.

In the foregoing data recording media, the visible data recording layer preferably comprises a liquid crystal polymer. The recording layer may have a protective layer laminated thereon.

DETAILED DESCRIPTION OF THE INVENTION

Figure 1A:
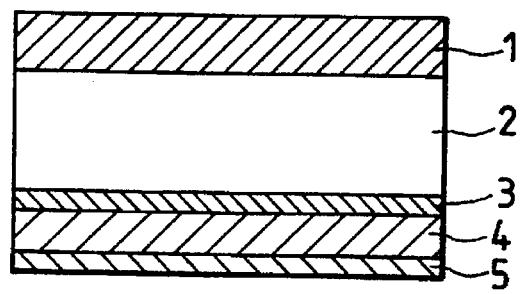
FIG. 1(a) is a sectional view illustrating a first embodiment of the data recording medium of the present invention.

The constitution of the data recording medium of the present invention will be described.

The data recording medium of the present invention can assume various forms depending on the purpose. FIGS. 1(a) to 1(d) each illustrates an embodiment of the data recording medium of the present invention. In these drawings, reference numeral 1 indicates a visible data recording layer, reference numeral 2 indicates a transparent substrate layer, reference numeral 2a indicates a first transparent substrate layer, reference numeral 2b indicates a second transparent substrate layer, reference numeral 3 indicates a low refractive layer, reference numeral 4 indicates a colored substrate layer, reference numeral 5 indicates a magnetic recording layer, reference numeral 6 indicates a colored magnetic recording layer, and reference numeral 7 indicates a protective layer.

FIG. 1(a) illustrates a laminate of five layers, i.e., a visible data recording layer 1 which reversibly changes in degree of light scattering when externally stimulated, a transparent substrate layer 2, a low refractive layer having a lower refractive index than the transparent substrate layer 2, a colored substrate layer 4, and a magnetic recording layer 5, in this order.

Figure 1B:
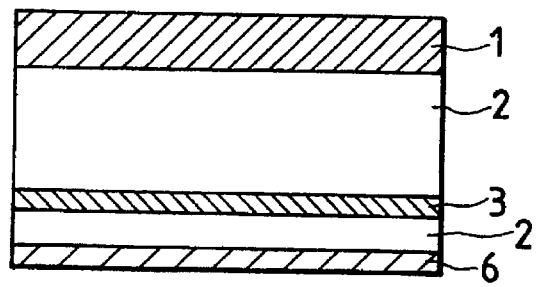
FIG. 1(b) is a sectional view illustrating a second embodiment of the data recording medium of the present invention.

FIG. 1(b) illustrates a laminate of five layers, i.e., a visible data recording layer 1 which reversibly changes in degree of light scattering when externally stimulated, a first transparent substrate layer 2a, a low refractive layer 3 having a lower refractive index than the first transparent substrate layer 2a, a second transparent substrate layer 2b, and a colored magnetic recording layer 6, in this order.

Figure 1C:
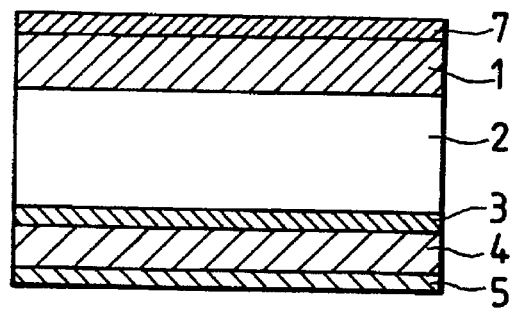
FIG. 1(c) is a sectional view illustrating a third embodiment of the data recording medium of the present invention.
Figure 1D:
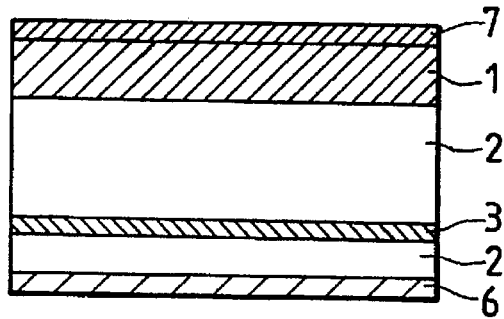
FIG. 1(d) is a sectional view illustrating a fourth embodiment of the data recording medium of the present invention.

FIGS. 1(c) and 1(d) each illustrates the same constitution as that of FIGS. 1(a) and 1(b) except that the visible data recording layer 1 has a protective layer 7 laminated thereon.

FIGS. 2(a) to (d) each illustrate an embodiment of the data recording medium of the present invention which comprises a visible data recording layer, a light reflective layer, a magnetic recording layer and a substrate layer. In these drawings, reference numeral 8 indicates a light reflective layer, and reference numeral 9 indicates a substrate layer.

Figure 2A:
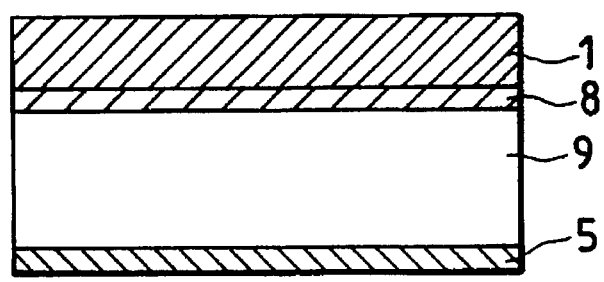
FIG. 2(a) is a sectional view illustrating a fifth embodiment of the data recording medium of the present invention.

FIG. 2(a) illustrates a laminate of a visible data recording layer 1, a light reflective layer 8, a substrate layer 9, and a magnetic recording layer 5 in this order.

Figure 2B:
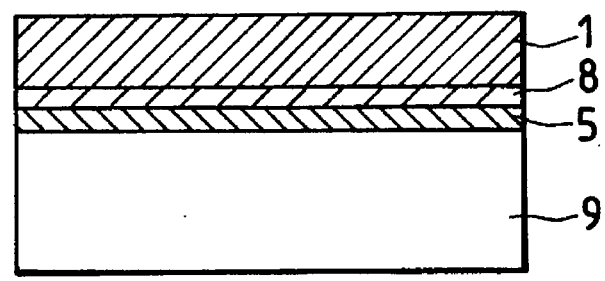
FIG. 2(b) is a sectional view illustrating a sixth embodiment of the data recording medium of the present invention.

FIG. 2(b) illustrates a laminate of a visible data recording layer 1, a light reflective layer 8, a magnetic recording layer 5, and a substrate layer 9 in this order.

Figure 2C:
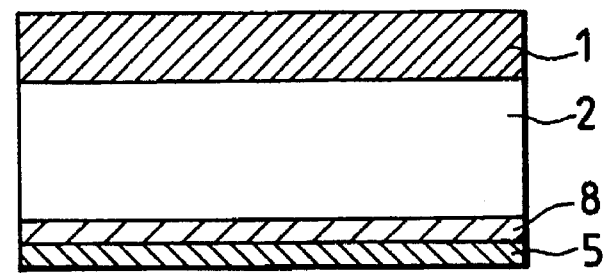
FIG. 2(c) is a sectional view illustrating a seventh embodiment of the data recording medium of the present invention.

FIG. 2(c) illustrates a laminate of a visible data recording layer 1, a transparent substrate 2, a light reflective layer 8, and a magnetic recording layer 5 laminated in this order.

Figure 2D:
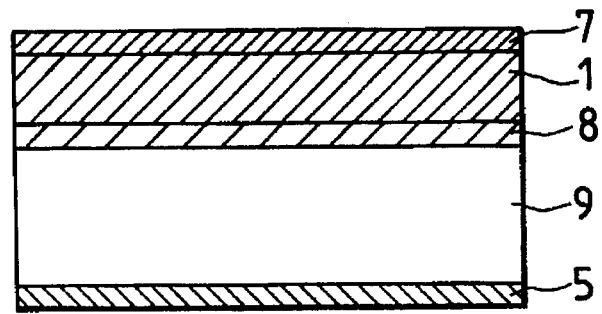
FIG. 2(d) is a sectional view illustrating an eighth embodiment of the data recording medium of the present invention.

FIG. 2(d) illustrates the same constitution as that of FIG. 2(a) except that the visible data recording layer has a protective layer 7 laminated thereon.

The various layers constituting the data recording medium of the present invention are described below.

The visible data recording layer 1 constituting the data recording medium of the present invention which changes in degree of light scattering when externally stimulated can perform rewritable recording of visible data. The visible data recording layer 1 may comprise a material having an organic polymer compound dispersed in a polymer binder, a liquid crystal polymer, a blended material of two or more kinds of polymer compounds, or the like. Such a material can reversibly change in degree of light scattering when externally acted upon by heat or the like, preferably alternating between a turbid state and a transparent state. Particularly preferred among these materials are the liquid crystal polymer and the material having an organic low molecular compound dispersed in a polymer binder because they have excellent properties.

Examples of the material having an organic low molecular compound dispersed in a polymer binder for use in the present invention include materials having an organic low molecular compound such as aliphatic acids and esters thereof (e.g., arachic acid, palmitic acid, stearic acid, behenic acid, lauric acid, dodecyl laurate) dispersed in a polymer binder such as acrylic resins, styrene resins, vinyl chloride resins and copolymers thereof, vinylidene chloride resins and copolymers thereof, styrene-butadiene resins, polyester resins and polyamide resin. Specific examples of the polymer binder include resins having high optical transparency such as polymethyl methacrylate, polyvinyl chloride, vinyl chloride/vinyl acetate copolymers, vinylidene chloride/vinyl acetate copolymers, polyfluoroacetones, polyesters. Preferred examples of the organic low molecular compound include arachic acid, stearic acid, behenic acid, esters of these compound, and blends of these compound. Preferred examples of the polymer binder include polymethyl methacrylate, polyvinyl chloride and vinyl chloride/vinyl acetate copolymers. The amount of the organic low molecular compound dispersed in the polymer binder is generally in the range of from 20 to 80% by weight, preferably from 30 to 70% by weight, based on the weight of the resulting dispersed material. The polymer binder may be crosslinked or may form an interpenetrating polymer network (IPN) with a thermosetting resin for improving durability thereof. In general, materials which can perform recording and erasure of visible data utilizing its phenomenon of repeated changes in degree of light scattering due to change in the crystallinity or compatibility of the two components caused by the change of an external stimulation such as a heating temperature, can be used.

The visible data recording layer comprising the material having an organic low molecular compound dispersed in a polymer binder can be prepared by dissolving the organic low molecular compound and the polymer binder in a common solvent at a predetermined ratio, and applying the solution followed by drying where the organic low molecular compound is subjected to crystallization to generate crystals having a predetermined size in the polymer binder, or by grinding crystals of the organic low molecular compound, mixing and dispersing the grinded crystal in a solution of the polymer binder, and then applying the dispersion followed by drying.

Examples of the liquid crystal polymer for use in the present invention include main chain type liquid crystal polymers having a mesogen group (a molecule exhibiting properties of liquid crystal) in its main chain, and side chain type liquid crystal polymers having a mesogen group in its side chains. Of these, the side chain type liquid crystal polymer is preferably used in the present invention.

The side chain type liquid crystal polymer for use in the present invention preferably include those having a repeating structural unit represented by the following structural formula 1, 2 or 3:

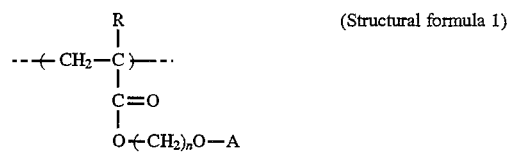
(Structural formula 1)

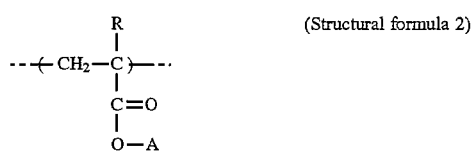
(Structural formula 2)

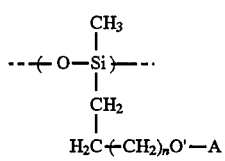
(Structural formula 3)

wherein R represents a hydrogen atom or a methyl group; n represents an integer of from 1 to 30; and A represents a mesogen group selected from those represented by the following general formulae (a) to (k):

wherein X and Y each represent a single bond, —N=N—, —N(—O)=N—, —CH=N—, —N=CH—, —COO—, —C(C=O)— or an ethynylene group; $R^1$ represents an alkoxy group generally having from 1 to 30 carbon atoms, a halogen atom, cyano group, carboxyl group or an alkyl group generally having from 1 to 30 carbon atoms; and p represents an integer of from 1 to 5, with the proviso that when p is 2 or more, the plurality of $R^1$ may be the same or different.

In the present invention, a phase separation type liquid crystal polymer having a non-mesogenic component copolymerized in its side chain, obtained by the copolymerization of a mesogenic monomer with a non-mesogenic monomer, is preferably used. This type of liquid crystal polymers are disclosed in JP-A-4-218024 and JP-A-6-18866. The use of such a liquid crystal polymer makes it possible to drastically enhance contrast of recorded images and optimize the heat sensitivity of a recording medium.

In the present invention, a crosslinked side chain type liquid crystal polymer is preferably used. In particular, a crosslinked side chain type liquid crystal polymer having an optically anisotropic multi-domain structure is preferred. If a liquid crystal polymer is crosslinked to form an optically anisotropic multi-domain structure having a specified domain diameter, a liquid crystal polymer which can perform high-speed and stable recording and erasure can be obtained. The multi-domain structure as defined herein refers to a structure made of an aggregate of a plurality of microdomains having an optical anisotropy (birefringence), and the structure strongly scatters light. In particular, the multi-domain structure preferably has a diameter of the domains of from 0.2 μm to 1.5 μm at the maximum of the distributed number of domains because such a multi-domain structure can scatter light most strongly.

The crosslinking of the side chain type liquid crystal polymer can be accomplished by a process which comprises forming a layer containing a side chain type liquid crystal polymer, and then subjecting the layer to external stimulation by heat, light, electron rays or the like so that it is crosslinked. Examples of the side chain type liquid crystal polymer to be crosslinked in the present invention include a compound containing a reactive group as a component of a main chain or a side chain. Such a compound can be crosslinked by utilizing the reactive group contained therein with a catalyst or a multi-functional reactive compound added thereto as needed. Specific examples of the reactive group which introduced into the liquid cyrstal polymer include vinyl group, acrylate group, methacrylate group and epoxy group, groups which can undergo addition or polymerization (e.g., isocyanate group), hydroxyl group, amino group, amide group, thiol group, carboxyl group, sulfonic acid group, phosphoric acid group, metal alcoholate group, and magnesium halide group (Grignard reagent). Preferred examples of the catalyst which may be preferably used in the present invention include various ultraviolet polymerization initiators and heat polymerization initiators. Preferred examples of the multi-functional reactive compound which may be preferably used in the present invention include multi-functional isocyanate compounds, multi-functional epoxy compounds, multi-functional melamine compounds, multi-functional aldehyde compounds, multi-functional amine compounds and multi-functional carboxyl compounds.

The foregoing side chain type liquid crystal polymer having a mesogenic monomer structural unit and a non-mesogenic monomer structural unit and crosslinkable side chain type liquid crystal polymer can be prepared by copolymerizing a polymerizable mesogenic monomer and a polymerizable non-mesogenic compound (which include, as examples thereof, the foregoing compounds having a crosslinking reactive group) or by subjecting a mesogenic monomer which can undergo additional polymerization reaction and a non-mesogenic compound which can undergo additional polymerization reaction to additional polymerization reaction to a reactive polymer such as hydrogenated polysilicone. The synthesis of such a side chain type liquid crystal polymer is disclosed in Makromol. Chem., 179, page 273 (1978), Eur. Polym. J., 18, page 651 (1982), Mol. Cryst. Liq. Cryst., 169, page (1989), etc.

The side chain type liquid crystal polymer for use in the present invention can be prepared in the same manner as mentioned above. Representative examples of the foregoing mesogenic monomer which can undergo additional polymerization reaction and mesogenic compound which can undergo additional polymerization reaction include various compounds comprising a rigid molecule (mesogen) such as biphenyl, phenyl benzoate, cyclohexyl benzene, azoxy benzene, azobenzene, azomethine, phenylpyrimidine, diphenyl acetylene, biphenyl benzoate, cyclohexyl biphenyl, terphenyl and derivatives thereof having an acrylic ester group, a methacrylic ester group or vinyl group bonded thereto via an alkyl spacer having a specific length.

Representative examples of the structure of these compounds are given below, but the present invention is not limited thereto.

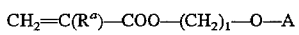

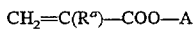

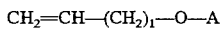

wherein $R^a$ represents a hydrogen atom or methyl group; $l$ represents an integer of from 1 to 30, preferably from 1 to 18; and A represents a mesogen group A as defined in the structural formula 1.

In the preparation of the liquid crystal polymer of the present invention, compounds useful for enhancing contrast of recorded images and for optimizing thermal properties of the recording medium are preferably used as the non-mesogenic monomer and non-mesogenic compound to be copolymerized or co-added with the foregoing mesogenic monomer. Examples thereof include alkyl (meth)acrylates and derivatives thereof, styrene and derivatives thereof, vinyl acetate, (meth)acrylonitrile, vinyl chloride, vinylidene chloride, vinyl pyrrolidone, 1-hexene, 1-octene, and compound containing a crosslinking reactive group such as (meth)acrylic acid, ω-carboxy-polycaprolactonemono (meth)acrylate, vinyl sulfonate, hydroxyethyl (meth)acrylate, hydroxypropyl (meth)acrylate, 2-(meth)acryloxyethyl acid phosphate, 2-hydroxy-3-phenoxypropyl (meth)acrylate, 2-(meth)acryloxyethyl succinate, phthalic mono(meth)acrylate, 2-(meth)acryloxyethyl (2-hydroxy) phthalate, 4-(meth)acryloxyalkyloxy-benzoic acid, glyceryl (meth)acrylate, hydroxy-substituted styrene, (meth)acrylamide, N,N-dimethylaminoethyl (meth)acrylate, N,N-diethylaminoethyl (meth)acrylate, glycidyl (meth)acrylate, 2-propene-1-ol and 5-hexene-1-ol. The present invention is not specifically limited to these compounds. In the copolymerization reaction with a mesogenic monomer or the addition reaction to a liquid crystal polymer, the foregoing compound preferably used in an amount of from 0.1 to 70 mol %, particularly preferably from 1 to 50 mol %, as calculated in terms of monomer unit of the liquid crystal polymer.

The liquid crystal polymer of the present invention can be prepared by the homopolymerization reaction or copolymerization reaction such as radical polymerization and ionic polymerization of the foregoing monomer and reaction compound or by the addition reaction of the foregoing monomer and reaction compound with a reactive polymer. The weight-average molecular weight of the liquid crystal polymer for use in the present invention is preferably from 1,000 to 1,000,000, particularly preferably from 10,000 to 500,000. The mechanism of the copolymerization reaction may be in various forms such as random copolymerization, block copolymerization, graft copolymerization and alternating copolymerization.

Various components may be added to the visible data recording layer of the present invention for improving various properties thereof. For example, for improving weather resistance, various oxidation inhibitors such as hindered amine and hindered phenol may be added to the data recording layer. Further, for enhancing contrast of recorded images, various dichroic dyes such as anthraquinone dyes, styryl dyes, azomethine dyes and azo dyes may be added thereto. Moreover, for improving light scattering properties, various fluorescent dyes may be added thereto. For efficiently carrying out thermal writing with laser, various laser-absorbing dyes are preferably added thereto (near infrared-absorbing dyes such as phthalocyanine, squarylium and azulenium may be used in the case where ordinary semiconductor laser having an emission wavelength of from 780 nm to 830 nm is used). The foregoing various components are each preferably added in an amount of from 0.01 to 5% by weight based on the weight of the composition for visible data recording layer. Further, a low molecular nematic or smectic liquid crystal compound may be added to the composition in an amount of from 1 to 20% by weight for improving sensitivity in recording or contrast of the recorded images.

The principle of a phase change type recording/erasure method on the data recording medium of the present invention utilizing heat control is described below.

The visible data recording layer 1 of the data recording medium having a liquid crystal polymer initially has an optically anisotropic multi-domain structure to exhibit a state of light scattering (turbid). When recording is effected on the data recording medium, a thermal head, laser or the like may be used to partially heat the data recording medium so that the state of the liquid crystal polymer is converted to an isotropic state (transparent). Thereafter, when the data recording medium is quenched, the heated area remains isotropic and fixed in a glass state so that the recorded area becomes transparent. On the other hand, when the recorded data is erased, the heated data recording medium is cooled slowly as compared with the recording time so that it is returned to the initial light scattering state to erase the recorded data. By repeating the foregoing procedure, recording/erasure can be reversibly realized any number of times. The heating for recording/erasure, if a thermal head for example is used, can be accomplished by controlling the width or energy of the pulse applied to the thermal head. Alternatively, recording/erasure can be accomplished by a procedure which comprises initially keeping the visible data recording layer transparent, and then making the recording layer turbid for recording. The recording/erasure can be also accomplished by utilizing electric field or magnetic field. Details of the recording/erasure are described, for example, in JP-A-63-191673.

The visible data recording layer 1 of the present invention can be formed by coating with a solvent. Examples of the solvent include ketone type, aromatic type, ether type or halogen type solvents. The thickness of the visible data recording layer of the present invention is from 0.1 μm to 50 μm, preferably from 1 μm to 20 μm.

In the case where crosslinking is effected, such a procedure is preferably employed that comprises the application of the coating solution to have a predetermined thickness, and then subjecting the coated material to heat, light or electron rays so that it is crosslinked.

The transparent substrate layer 2 or first transparent substrate layer 2a constituting the data recording medium of the present invention comprises a material having a higher refractive index than the low refractive layer 3. The refractive index of the transparent substrate layer 2 of first transparent substrate layer 2a is generally from 1.3 to 2.0. Preferred example thereof include films made of a resin such as polyester resins, polyether resins, polyurethane resins, polyamide resins, acrylic resins, polyimide resins, polyethylene resins, polypropylene resins, polyvinyl chloride resins, polyvinylidene chloride resins and polycarbonate resins. The thickness of the transparent substrate layer is from 1 μm to 500 μm, preferably from 10 μm to 200 μm.

The low refractive layer 3 comprises a material having a lower refractive index than the transparent substrate layer 2 or first transparent substrate layer 2a. The refractive index of the low refractive layer 3 is generally from 0.8 to 1.4. As such a layer there may be preferably used a resin layer made of, for example, fluorine resin, a gas layer or a vacuum layer. In particular, a gas layer or a vacuum layer having a great difference from the transparent substrate layer 2 or first transparent substrate layer 2a in refractive index is preferred. As the gas layer there may be preferably used an air layer. In the case where a gas layer or vacuum layer is selected as the low refractive layer, the low refractive layer can be formed by making the colored substrate layer 4 (or second transparent substrate layer 2b) adhered to the transparent substrate layer 2 (or first transparent substrate layer 2a) with an adhesive spacing material, or by making the layers partially adhered each other in the presence of a gas or under vacuum, followed by fixing the colored substrate layer 4 (or second transparent substrate 2b) and the transparent substrate layer 2 (or first transparent substrate layer 2a). On the other hand, in the case where a resin having a low refractive index such as fluorine resin is used as the low refractive layer 3, the low refractive layer can be formed by applying a coating solution of the material with a solvent or by contact-bonding of a film made of the material using a pressure roll laminating apparatus. Examples of the solvent include ketone type, aromatic type, ether type or halogen type solvents. The difference in refractive index between the low refractive layer 3 and the transparent substrate layer 2 or first transparent substrate layer 2a is preferably not less than 0.1, more preferably not less than 0.2. The thickness of the low refractive layer is preferably from 0.01 μm to 100 μm, particularly from 0.1 μm to 10 μm.

The colored substrate layer 4 may comprise a resin containing various dyes. Examples of the dyes include carbon black and various pigments and dyes. Examples of the resin include polyester resins, polyether resins, polyurethane resins, polyamide resins, acrylic resins, polyimide resins, polyethylene resins, polypropylene resins, polyvinyl chloride resins, polyvinylidene chloride resins and polycarbonate resins. The hue of the dye can be selected from various hues. The colored substrate layer 4 can be prepared by kneading the foregoing resin with the foregoing dye or by coating the resin containing the dye to a substrate such as film. The colored substrate layer 4 contains the dye in an amount of generally from 0.1 to 20% by weight based on the total weight of the layer. The thickness of the colored substrate layer 4 is preferably from 1 μm to 500 μm, particularly preferably from 10 μm to 200 μm.

The second transparent substrate layer 2b may comprises a material similar to the first transparent substrate layer 2a. The two layers may comprise the same or different materials.

The magnetic recording layer 5 or colored magnetic recording layer 6 of the present invention may comprise various magnetic materials dispersed in a resin. Examples of such magnetic materials include $BaO\text{-}6Fe_2O_3$, $Fe_3O_4$, $\gamma\text{-}Fe_2O_3$, $Co\text{-}\gamma\text{-}Fe_2O_3$, and $Cr_2O_3$. Examples of the resin employable herein include thermoplastic resin or thermosetting resin such as vinyl chloride-vinyl acetate resins, polyester resins, urethane resins, acrylic resins and epoxy resins. The colored magnetic recording layer 6 is generally prepared by employing a colored magnetic material as a magnetic material or by adding various dyes or pigments of colored additives to the composition of the magnetic recording layer. In particular, a deeply colored magnetic material such as $Co\text{-}\gamma\text{-}Fe_2O_3$ and $Cr_2O_3$ may be preferably used because there is no need to add any dye or pigment thereto. If the colored magnetic recording layer 6 is used, the second transparent substrate layer 2 can be used as an adjacent substrate to eliminate the necessity of using the colored substrate 4, which is relatively expensive. The magnetic recording layer 5 and the colored magnetic recording layer 6 generally contain the magnetic material in an amount of from 20 to 90% by weight, preferably from 40 to 90% by weight, based on the total weight of the layer, and further may have various additives such as abrasive material or wax added thereto. The magnetic recording layer 5 and the colored magnetic recording layer 6 may have a protective layer or printed layer provided on the surface thereof.

The magnetic recording layer 5 and the colored magnetic recording layer 6 are also preferably calendered to enhance the surface smoothness thereof. The magnetic recording layer 5 and the colored magnetic recording layer 6 each has a thickness of preferably from 0.1 μm to 50 μm, more preferably from 1 μm to 20 μm.

The visible data recording layer 1 preferably has the protective layer 7 formed thereon to inhibit the surface deterioration caused by repeated recording and erasure. As the protective layer 7 there may be preferably used a material having a high heat resistance. Various thermoplastic resins, fluorine resins, silicone resins, thermosetting resins, ultraviolet radiation curing resins, electron radiation curing resins, etc. can be used as the material. The protective layer 7 may comprise a plurality of layers laminated. The thickness of the protective layer 7 is preferably from 0.1 μm to 20 μm. Besides the foregoing various layers, various adhesive layers for enhancing the adhesion between the various layers, or a smooth layer or a protective layer for inhibiting the surface roughness of the magnetic recording layer 5 may be preferably formed. Further, a printed layer is preferably formed on the visible data recording layer 1, the protective layer 7 or the magnetic recording layer 5.

The visible data recording layer 1 and the magnetic recording layer 5 may be formed by applying the coating solution in a solvent by various coating methods such as gravure roll method, die coat method, blade method, wire bar method, spray method and screen method. The coated layer thus formed is then subjected to heat treatment or irradiation with light or electron radiation as needed. The other various layers may be formed in similar manners. In the case where a metal layer is formed as the light reflective layer 8, vacuum metallizing or sputtering is generally employed. Examples of the material for the light reflective layer 8 include aluminum, tin, silver, nickel and gold.

The data recording medium of the present invention has the foregoing constitution and thus can perform recording of visible data having excellent recognizability and contrast. The present invention is further described with reference to this case.

Figure 3A:
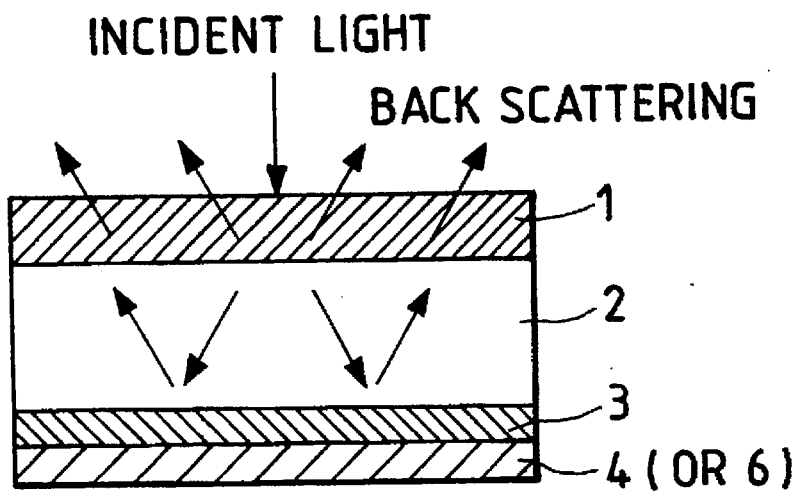
FIGS. 3(a) and 3(b) are sectional views for illustrating the process of recording visible data on the data recording medium of the present invention by changing light scattering.

FIGS. 3(a) and (b) each is a typical sectional view illustrating the process of recording visible data on the data recording medium of the present invention by changing the degree of light scattering of the visible data recording layer.

FIG. 3(a) illustrates how the incident light behaves when the recording layer in the light scattering state is irradiated with light. In general, some components of the incident light is scattered by the visible data recording layer 1 and then goes out (back scattering) while the other components pass through the visible data recording layer 1. If the visible data recording layer 1 scatters all the components of the incident light backward, it exhibit a higher turbidness, enabling high contrast recording. This is an ideal structure.

However, it is extremely difficult to eliminate any component which passes through the visible data recording layer 1 because the thickness of the visible data recording layer 1 is restricted. When light is incident upon a medium from another medium having a higher refractive index than the former medium, the light tends to be reflected by the former medium when the angle of incidence is great. The light which has passed through the visible data recording layer 1 is refracted by the visible data recording layer 1. Therefore, when a low refractive layer is formed on the side of the substrate opposite the visible data recording layer 1, the transmitted light is incident upon the low refractive layer 3 at a great angle. The light is then reflected by the interface and scattered by the visible data recording layer 1 again. Thus, high light scattering properties can be obtained. If a colored layer (the colored substrate layer or the colored magnetic recording layer) is formed without providing this low refractive layer, the components of light which have passed through the visible data recording layer is absorbed by the colored layer, to thereby cause a drastic reduction of the turbidness of the recording layer.

Figure 3B:
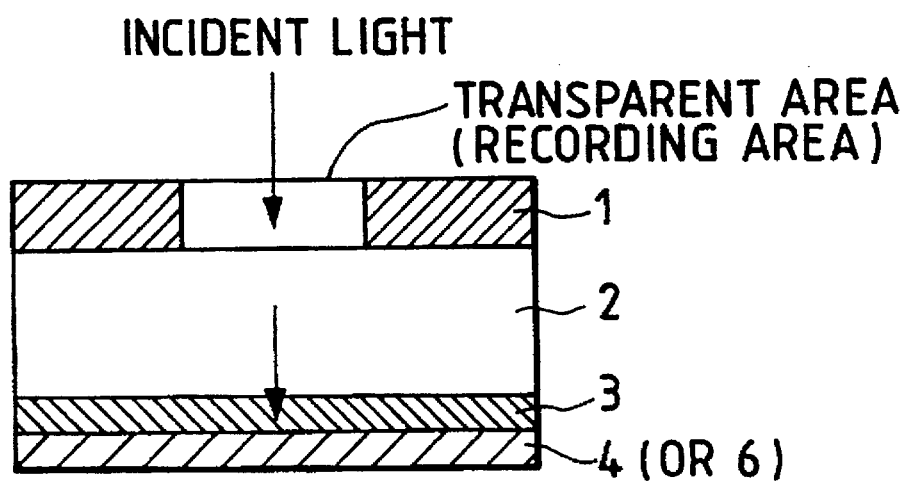

FIG. 3(b) illustrates how the incident light behaves when the visible data recording layer 1 in the transparent state is irradiated with light. Most of the incident light passes through the visible data recording layer 1, and the transmitted light is incident upon the low refractive layer 3 at a small angle and thus is absorbed by the colored layer without being reflected by the low refractive layer 3, to thereby develop a sharp color.

The data recording medium of the present invention comprising a substrate having thereon a rewritable visible data recording layer which performs recording utilizing changes in the degree of light scattering thereof, the substrate being laminated, via a low refractive layer, on a colored substrate having thereon a magnetic recording layer, or on a substrate having thereon a colored magnetic recording layer. The low refractive layer can serve as a light reflective layer to drastically enhance the recognizability of the visible data recording layer. Further, when a colored magnetic recording layer is used, the use of a colored substrate or the like can be omitted.

In the data recording medium having the constitution of FIG. 2(a), as the substrate 9 there may be used a material having a high or low transparency or a colored material. In this case, the magnetic recording layer 5 and the visible data recording layer 1 are on the opposite sides of the substrate 9. This structure is advantageous in that recording on the magnetic recording layer 5 is not adversely affected by the thickness of the various layers or the surface properties thereof. In the constitution of FIG. 2 (b), the magnetic recording layer 5 and the visible data recording layer 1 are formed on one side of the substrate 9. Thus, the other side of the substrate 9 can be used for other purposes. For example, the other side of the substrate 9 can be decorated or printed in various manners. On the other hand, referring to recording on the magnetic recording layer 5, if the thickness of the visible data recording layer 1 (and the protective layer 7) is increased, the magnetic recording characteristics are deteriorated and can be easily affected by the surface properties of the visible data recording layer 1. The data recording medium having the constitution of FIG. 2(c) has almost the same properties as FIG. 2(a). However, since the visible data recording layer 1 and the light reflective layer 8 are formed via a substrate, it is necessary that a substrate having excellent transparency be used. If the transparency of the substrate is low, the effect of the light reflective layer is lessened.

The present invention is described in more detail with reference to the following examples, but the present invention should not be construed as being limited thereto. All the parts are by weight unless otherwise indicated.

EXAMPLE 1

| (Formation of Magnetic Recording Layer) | |
|---|---|
| Magnetic material: | |
| $BaO.6(Fe_2O_3)$ | 25 parts |
| Binder: | |
| Vinyl chloride/vinyl acetate/ vinyl alcohol copolymer (trade name: VAGH, available from UCC) | 5 parts |
| Colonate L (available from Nippon Polyurethane Industry Co., Ltd.) | 1 part |
| Solvent: | |
| Methyl ethyl ketone | 30 parts |
| Toluene | 30 parts |

The foregoing materials were mixed and dispersed. The dispersion thus obtained was applied to a PET film having a 100-μm thick aluminum-deposited layer on the PET side by means of a wire bar, and then dried to form a magnetic recording layer having a thickness of about 10 μm.

(Formation of Visible Data Recording Layer and Preparation of Data Recording Medium)

With 5 ml of tetrahydrofuran as a solvent in the presence of 0.01 g of azobisisobutylonitrile (AIBN) as a polymerization initiator, 1.9 g of 4-acryloxyhexyloxy-4'-cyanobiphenyl as a mesogenic monomer and 0.1 g of 2-hydroxyethyl methacrylate as a non-mesogenic monomer containing a reactive group were allowed to undergo polymerization. The resulting polymer solution was then subjected to precipitation with ethyl alcohol as a precipitating solvent three times so that it was purified to obtain 1.9 g of a liquid crystal polymer represented by the following structural formula (1):

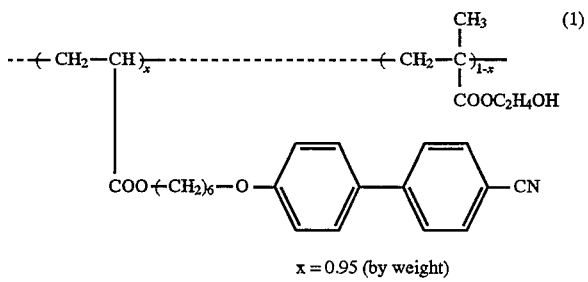

x = 0.95 (by weight)

The liquid crystal polymer thus obtained was then measured for physical properties. As a result, the liquid crystal polymer was found to have a weight-average molecular weight of 80,000 as calculated in terms of polystyrene by GPC, a glass transition temperature (Tg) of 40° C. and a liquid phase-isotropic phase transition temperature (Ti) of 115° C.

To 1.0 g of the liquid crystal polymer were then added 0.04 g of 4,4'-diphenylmethane diisocyanate as a crosslinking agent and 3.0 g of methyl ethyl ketone (MEK) as a solvent to make a solution. The solution thus obtained was applied to the PET film having a magnetic recording layer formed thereon on the aluminum-deposited side thereof by means of a blade coater, and then dried to form a visible data recording layer having a thickness of about 5 µm. The visible data recording layer was then allowed to undergo reaction in a 50° C. oven for 48 hours so that it was crosslinked. The visible data recording layer thus obtained was light-scattering and turbid. An ultraviolet radiation curing composition (trade name: ARONIX UV, available from Toagosei Chemical Industry Co., Ltd.) was then applied to the visible data recording layer. The ultraviolet radiation curing composition thus applied was then irradiated with light from a high-voltage mercury vapor lamp so that it was cured to form a protective layer having a thickness of about 2 µm on the crosslinked visible data recording layer. Thus, a data recording medium was prepared.

EXAMPLE 2

(Formation of Magnetic Recording Layer)

| Magnetic material: | |
| --- | --- |
| Co-γ-Fe$_2$O$_3$ | 25 parts |
| Binder: | |
| Vinyl chloride/vinyl acetate/ vinyl alcohol copolymer (trade name: VAGH, available from UCC) | 5 parts |
| Colonate L (available from Nippon Polyurethane Industry Co., Ltd.) | 1 part |
| Solvent: | |
| Methyl ethyl ketone | 30 parts |
| Toluene | 30 parts |

The foregoing materials were mixed and dispersed. The dispersion thus obtained was applied to a 100-µm thick black PET film by means of a wire bar, and then dried to form a magnetic recording layer having a thickness of about 10 µm. The magnetic recording layer thus formed was then calendered to enhance its surface smoothness. A solution of a polyvinyl butyral in butyl alcohol was applied to the magnetic recording layer, and then dried to form a smooth layer having a thickness of about 2 µm thereon. Aluminum was then vacuum-deposited on the smooth layer to form an aluminum layer having a thickness of about 2 µm as a light reflective layer.

(Formation of Visible Data Recording Layer and Preparation of Data Recording Medium)

A data recording medium was prepared by forming a visible data recording layer having the same composition as used in Example 1 and a protective layer on the aluminum-deposited layer of the foregoing PET film having a magnetic recording layer formed thereon in the same manner as in Example 1.

EXAMPLE 3

(Formation of Magnetic Recording Layer)

| Magnetic material: | |
| --- | --- |
| γ-Fe$_2$O$_3$ | 25 parts |
| Binder: | |
| Vinyl chloride/vinyl acetate/ vinyl alcohol copolymer (trade name: VAGH, available from UCC) | 5 parts |
| Colonate L (available from Nippon Polyurethane Industry Co., Ltd.) | 1 part |
| Solvent: | |
| Methyl ethyl ketone | 30 parts |
| Toluene | 30 parts |

The foregoing materials were mixed and dispersed. The dispersion thus obtained was applied to a 75-µm thick black polyethylene terephthalate (PET) film (PET kneaded with carbon black) by means of a wire bar, and then dried to form a magnetic recording layer having a thickness of about 10 µm.

(Formation of Visible Data Recording Layer)

With 5 ml of methyl ethyl ketone as a solvent in the presence of 0.01 g of azobisisobutylonitrile (AIBN) as a polymerization initiator, 1.9 g of 4-acryloxyhexyloxy-4'-cyano-biphenyl as a mesogenic monomer and 0.1 g of 2-hydroxyethyl acrylate as a non-mesogenic monomer containing a reactive group were allowed to undergo polymerization. The resulting polymer solution was then subjected to precipitation with ethyl alcohol as a precipitating solvent three times so that it was purified to obtain 1.9 g of a liquid crystal polymer represented by the following structural formula (2):

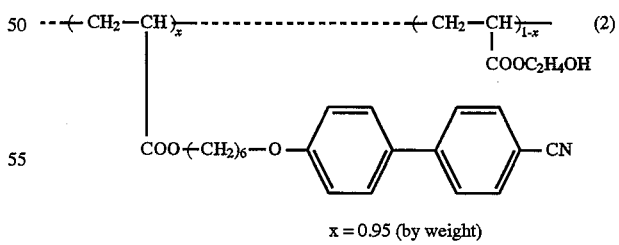

x = 0.95 (by weight)

The liquid crystal polymer thus obtained was then measured for physical properties. As a result, the liquid crystal polymer was found to have a weight-average molecular weight of 80,000 as calculated in terms of polystyrene by GPC, a glass transition temperature (Tg) of 40° C. and a liquid phase-isotropic phase transition temperature (Ti) of 110° C.

To 1.0 g Of the foregoing liquid crystal polymer were then added 0.03 g of 4,4'-diphenylmethane diisocyanate as a crosslinking agent and 3.0 g of methyl ethyl ketone (MEK) as a solvent to make a solution. The solution thus obtained was applied to a 75-μm thick transparent PET film (refractive index: 1.575) by means of a blade coater, and then dried to form a visible data recording layer having a thickness of about 7 μm. The visible data recording layer was then allowed to undergo reaction in a 50° C. oven for 48 hours so that it was crosslinked. The visible data recording layer thus obtained was light-scattering and turbid. An ultraviolet radiation curing composition (trade name: ARONIX UV, available from Toagosei Chemical Industry CO.. Ltd.) was then applied to the visible data recording layer. The ultraviolet radiation curing composition thus applied was then irradiated with light from a high-voltage mercury vapor lamp so that it was cured to form a protective layer having a thickness of about 2 μm on the crosslinked visible data recording layer.

(Preparation of Data Recording Medium)

An adhesive resin spacer having a diameter of 10 μm was dispersed on the other side of the foregoing film having a magnetic recording layer formed thereon. This film and the foregoing film having a visible data recording layer formed thereon were laminated in such an arrangement that the adhesive resin spacer-dispersed side of the former film was brought into contact with the side of the latter film opposite the visible data recording layer. The laminate was then subjected to thermocompression bonding by means of a heat roller. Thus, a data recording medium comprising an air layer as a low refractive layer (refractive index: 1.0) was prepared.

EXAMPLE 4

| (Formation of Magnetic Recording Layer) | |
|---|---|
| Magnetic material: | |
| Co-γ-Fe₂O₃ | 25 parts |
| Binder: | |
| Vinyl chloride/vinyl acetate/ vinyl alcohol copolymer (trade name: VAGH, available from UCC) | 5 parts |
| Colonate L (available from Nippon Polyurethane Industry Co., Ltd.) | 1 part |
| Solvent: | |
| Methyl ethyl ketone | 30 parts |
| Toluene | 30 parts |

The foregoing materials were mixed and dispersed. The dispersion thus obtained was applied to a 75-μm thick transparent PET film by means of a wire bar, and then dried to form a magnetic recording layer having a thickness of about 10 μm.

(Formation of Visible Data Recording Layer)

The foregoing film having a magnetic recording layer formed thereon was then cut into 10-cm square specimens. A hot-melt adhesive film ribbon (width: 2 mm) was then placed on the four corners of the side of the film opposite the magnetic recording layer. This film and the foregoing film having a visible data recording layer formed thereon as used in Example 1 (10 cm square) were then laminated in such an arrangement that the film ribbon side of the former film was brought into contact with the side of the latter film opposite the visible data recording layer. The two films were then subjected to thermocompression bonding at the four corners to prepare a data recording medium comprising an air layer as a low refractive layer.

(Recording on and Evaluation of Rewritable Visible Data Recording Layer)

The visible data recording layer of the data recording media prepared in Examples 1 to 4 were evaluated for recording properties and image recorded thereon.

All these data recording media allowed recording of a sharp black image on the turbid background at a resolution of 8 dots/mm and a sensitivity of about 0.3 mj/dot using a thermal head type heat-sensitive recording evaluation apparatus. The image thus recorded could be erased by passing these data recording media under a heat roller (kept at 120° C.).

The optical reflection density of the image thus recorded was measured by means of X-rite 968 (available from X-rite Co., Ltd.). The reflectance of the incident light (%) was then calculated from the optical reflection density. Contrast ratio of the recorded image was then calculated from the ratio of the reflectance of the recorded area to that of the non-recorded area. The results are set forth in Table 1.

TABLE 1

| Example No. | Optical density of turbid area (reflectance) | Optical density of recorded area (reflectance) | Image contrast (reflectance ratio) |
|---|---|---|---|
| Example 1 | 0.21 (62%) | 1.90 (1.3%) | 48 |
| Example 2 | 0.19 (65%) | 1.70 (2.0%) | 33 |
| Example 3 | 0.67 (21%) | 1.90 (1.3%) | 16 |
| Example 4 | 0.66 (22%) | 1.80 (1.6%) | 14 |

Both the data recording media prepared in Examples 1 and 2 exhibited a good image contrast and an excellent recognizability.

Both the data recording media prepared in Examples 3 and 4 exhibited a good image contrast. These data recording media were black-and-white displays having an excellent recognizability.

(Recording on and Evaluation of Magnetic Recording Layer)

The recording properties of the magnetic recording layer of these recording media were evaluated by means of a magnetic recording evaluation apparatus. As a result, it was confirmed that these data recording media exhibit good recording properties and reproducing properties. The data recorded on the magnetic recording layer showed no change even if heating (predetermined to 120° C.) for erasure of the image recorded on the visible data recording layer was effected. The data recorded on the magnetic recording layer could be erased under ordinary conditions such as erasing head.

The data recording medium of the present invention comprises a visible data recording layer having a specific structure which reversibly changes in degree of light scattering when externally stimulated, and a magnetic recording layer to provide a well-recognizable image contrast. Further, since the data recording medium of the present invention exhibits excellent durability, it is widely applicable.

While the invention has been described in detail and with reference to specific examples thereof, it will be apparent to one skilled in the art that various changes and modification can be made therein without departing from the spirit and scope thereof.

What is claimed is:

1. A data recording medium comprising (a) a visible data recording layer, the degree of light scattering of which reversibly changes when externally stimulated, (b) a transparent substrate layer, (c) a low refractive layer having a lower refractive index than said transparent substrate layer, (d) a colored substrate layer and (e) a magnetic recording layer, laminated in this order.

2. The data recording medium according to claim 1, wherein said visible recording layer comprises a liquid crystal polymer.

3. The data recording medium according to claim 2, wherein said liquid crystal polymer comprises a mesogen structural unit and a non-mesogen structural unit.

4. The data recording medium according to claim 2, wherein said liquid crystal polymer has a mesogen structural unit and a non-mesogen structural unit in its side chain.

5. The data recording medium according to claim 2, wherein said liquid crystal polymer comprises a crosslinked liquid crystal polymer.

6. The data recording medium according to claim 1, wherein said visible data recording layer is a composite film comprising an organic low molecular compound and an organic polymer compound.

7. The data recording medium according to claim 5, wherein said crosslinked liquid crystal polymer has an optically anisotropic multi-domain structure.

8. The data recording medium according to 7, wherein said domain structure has a domain diameter of 0.2 $\mu$m to 1.5 $\mu$m at maximum distributed number of the domains.

9. The data recording medium according to claim 1, wherein said low refractive layer is a gas layer.

10. The data recording medium according to claim 1, wherein said data recording medium further comprises a protective layer laminated on said visible data recording layer.

* * * * *